United States Patent [19]

Yamanaka

[11] Patent Number: 5,075,261
[45] Date of Patent: Dec. 24, 1991

[54] SEALING MATERIAL

[75] Inventor: Toshio Yamanaka, Shiga, Japan

[73] Assignee: Nippon Electric Glass Co., Ltd., Otsu, Japan

[21] Appl. No.: 524,293

[22] Filed: May 15, 1990

[30] Foreign Application Priority Data

May 17, 1989 [JP] Japan .................................. 1-123799

[51] Int. Cl.$^5$ .............................................. C03C 8/24
[52] U.S. Cl. ...................................... 501/15; 501/17; 501/32; 501/49; 501/61; 501/75
[58] Field of Search ....................... 501/15, 17, 32, 49, 501/61, 75

[56] References Cited

U.S. PATENT DOCUMENTS

| | | | |
|---|---|---|---|
| 3,963,505 | 6/1976 | Dumesnil et al. | 501/15 |
| 3,973,975 | 8/1976 | Francel et al. | 501/15 |
| 4,002,799 | 1/1977 | Dumesnil et al. | 501/15 |
| 4,310,598 | 1/1982 | Takami et al. | 501/61 |
| 4,352,889 | 10/1982 | Takami et al. | 501/61 |
| 4,522,925 | 6/1985 | Pirooz | 501/15 |
| 4,743,302 | 5/1988 | Dumesnil et al. | 501/15 |

Primary Examiner—Mark L. Bell
Assistant Examiner—Jones: Deborah
Attorney, Agent, or Firm—Collard, Roe & Galgano

[57] ABSTRACT

A sealing material for sealing electronic parts is composed of a low-melting-point glass and a filler which has its surface modified by coating with ZnO and is compatible with low melting point glass.

9 Claims, No Drawings

SEALING MATERIAL

BACKGROUND OF THE INVENTION

1) Field of the Invention

The present invention relates to a sealing material comprising a glass having a low melting point and a filler, which is suitable for sealing electronic parts such as semiconductor devices, fluorescent display tubes, laser diodes, and the like, and more particularly to a sealing material comprising a glass having a low melting point and a filler which is surface-coated with ZnO for improvement of the compatibility with low melting point glass.

2) Description of the Prior Art

Conventionally, the following types of glass with a low melting point hereinafter referred to as "low-melting-point glass") are commonly known: a $PbO$-$B_2O_3$ based glass consisting essentially of 40 to 90 wt. % of PbO and 8 to 15 wt. % of $B_2O_3$; a $PbO$-$ZnO$-$B_2O_3$ based glass consisting essentially of 70 to 85 wt. % of PbO, 0.5 to 15 wt. % of ZnO, and 7 to 20 wt. % of $B_2O_3$; and a $PbO$-$B_2O_3$-$SiO_2$ based glass consisting essentially of 40 to 80 wt. % of PbO, 8 to 20 wt. % of $B_2O_3$ and 5 to 45 wt. % of $SiO_2$. Generally, the thermal expansion coefficients of these types of the low-meltingpoint glass are $90 \times 10^{31}$ 7/° C., and when such a low-melting-point glass is used to seal a material with a thermal expansion coefficient in the range of 40 to $80 \times 10^{31}$ 7/° C., a high stress is produced in the low-melting-point glass, so that such problems as cracking or breakage are caused. A sealing material in which the filler with low expansion characteristics is mixed with the low melting point glass is therefore mainly used to adjust the thermal expansion coefficient of glass to that of the material to be sealed.

Various types of materials exist which can be used as the filler with low expansion characteristics. Generally, zircon, willemite, cordierite, lead titanate, $\beta$-eucryptite, tin oxide and mullite are used.

There are other types of materials with low expansion characteristics which have characteristics superior to those of the materials usually used as fillers. For example, silica glass has a lower dielectric constant ($\epsilon$) than commonly used fillers. Therefore it is a material which possesses desirable characteristics in satisfying the recent trend that the materials used in semiconductor circuits to cope with high speed computation processes should have low dielectric constants. Also, in comparison with commonly used fillers, the use of crystalline oxides such as $ZrW_2O_8$ has a considerable effect in lowering the thermal expansion coefficient of sealing materials, and the use of nitrides has a considerable effect in improving the mechanical strength of sealing materials.

As outlined above, silica glass, crystalline oxides such as $ZrW_2O_8$, and the nitrides have the characteristics which are superior to those of commonly used fillers. However, a problem exists inasmuch as it is difficult to use these materials as fillers in actual practice because they are completely incompatible with low melting point glass, or their use is limited to small quantities. Specifically, when silica glass is dissolved into low melting point glass, the viscosity of that low melting point glass is drastically increased and the flow characteristics of the resulting sealing material are deteriorated. When a crystalline oxide such as $ZrW_2O_8$ is dissolved into a low melting point glass, the glass has a strong tendency to crystallize and the flow characteristics of the resulting sealing material are deteriorated. Nitrides react with low melting point glass so that bubbles are readily formed in sealing materials.

In U.S. patent application 4,310,598, there is disclosed a sealing composition having a low expansion coefficient comprising a low-melting-point glass and $\beta$-eucryptite particles coated with tin oxide. The tin oxide coating on the $\beta$-eucryptite particles, however, is not for improving the compatibility with low melting point glass, but for preventing the $\beta$-eucryptite particles from being dissolved into the low-melting-point glass, and for reducing the deterioration of the insulating properties of the sealing composition.

Furthermore, in U.S. Pat. No. 4,352,889, there is disclosed a sealing composition having a low expansion coefficient comprising (i) a powdery coating material, specifically $\beta$-eucryptite, with a negative thermal expansion coefficient, coated with titanium oxide and/or zirconium oxide and (ii) low-melting-point glass. The coating of the powdery coating material with titanium oxide and/or zirconium is not for improving the compatibility with glass, either, but for preventing Li contained in $\beta$-eucryptite from being diffused into glass and for reducing the deterioration of the insulating properties of the sealing composition.

SUMMARY OF THE INVENTION

It is therefore an object of the present invention to provide a sealing material with an improved compatibility with glass, a lower dielectric constant, higher mechanical strength, or lower expansion characteristics than a sealing material which uses conventionally known fillers.

According to the present invention, there is provided a sealing material comprising a low melting point glass and a filler which is surface-coated with ZnO.

DESCRIPTION OF PREFERRED EMBODIMENTS

In the sealing material according to the present invention which comprises a low melting point glass and a filler which is surface-coated with ZnO, it is preferable that the low-melting-point glass be selected from the group consisting of (i) a $PbO$-$B_2O_3$ based glass consisting essentially of 40 to 90 wt. % of PbO and 8 to 15 wt. % of $B_2O_3$; (ii) a $PbO$-$ZnO$-$B_2O_3$ based glass consisting essentially of 70 to 85 wt. % of PbO, 0.5 to 15 wt. % of ZnO, and 7 to 20 wt. % of $B_2O_3$; and (iii) a $PbO$-$B_2O_3$-$SiO_2$ based glass consisting essentially of 40 to 80 wt. % of PbO, 8 to 20 wt. % of $B_2O_3$ and 5 to 45 wt. % of $SiO_2$.

In the present invention, the materials for the filler can be selected from materials such as silica glass, crystalline oxides such as $ZrW_2O_8$ and nitrides, which are not compatible with low melting point glass and therefore not suitable as fillers when used as they are, although they have low expansion characteristics and low dielectric constants, which are most desirable characteristics for use as the filler materials.

Specific examples of the filler for use in the present invention include silica glass, crystalline oxides such as $ZrW_2O_8$, $Ta_{16}W_{16}O_{94}$ and $Nb_2O_5$, and nitrides such as $Si_3N_4$, AlN and BN. These fillers are coated with ZnO.

It is preferable that the thickness of the ZnO coating be in the range of 0.01 to 1 $\mu$m in order to demonstrate the effect of the ZnO sufficiently. If the coating is greater than 1 $\mu$m, there is no additional benefit in the effect produced, therefore, the thicker coating only contributes to an increase in the cost of the ZnO coating.

The ZnO-coated filler for use in the present invention has good compatibility with glass. In addition, the firm ZnO coating can be formed at comparatively low temperatures of 1,000° C. to 1,200° C. The coated filler has no detrimental effect on the flow characteristics when mixed with glass, and bubbles are not readily formed.

The following methods can be used to form the ZnO coating on the surface of the filler:

(1) Finely-divided particles of ZnO are well mixed with the filler and the mixture is heated to cause the ZnO particles to be firmly deposited and to form a ZnO layer on the surface of the filler.

(2) A zinc-containing liquid such as an aqueous solution of $ZnNO_3$ or a zinc alkoxide solution is coated onto the surface of the filler and, after drying, a ZnO layer is formed on the filler by the heat application.

(3) A layer of metallic zinc is formed on the surface of the filler by plating or sputtering, followed by the heat treatment to form a ZnO layer on the filler.

The present invention will now be explained in more detail with reference to the following examples.

EXAMPLE 1

Silica glass powder (made by and commercially available under the trademark of "FB4" from Denki Kagaku Kogyo Kabushiki Kaisha) was classified to obtain a silica glass powder with particles diameters in the 3 to 45 $\mu$m range and an average particle diameter of 30 $\mu$m.

95 parts by volume of this silica glass powder and 5 parts by volume of finely-divided particles of ZnO having an average diameter of about 0.5 $\mu$m were mixed in a dry state and heated at 1000° C. for 1 hour. As a result, a silica glass powder with a surface coating with ZnO of a thickness of 0.1 $\mu$m was obtained.

40 parts by volume of this ZnO-coated silica glass powder and 60 parts by volume of a low-melting-point glass (85 wt. % of PbO, 12.7 wt. % of $B_2O_3$, 1.0 wt. % of $SiO_2$, and 1.0 wt. % of $Al_2O_3$; transition point 310° C.; thermal expansion coefficient $110 \times 10^{-7}/°$ C. in the 30 to 250° C. range) were mixed, and a button of an outer diameter of 20 mm and a height of 5 mm was produced in a metal mold from a weight in grams of the mixed powder equivalent to the true specific weight of the mixed powder.

This button was placed on a glass plate and heated in an electric furnace at 450° C. for 10 minutes. As a result, the button flowed to an outer diameter of 26 mm. When a button of a silica glass sample prepared by the same process without the surface coating with ZnO was heated under the same conditions, there was essentially no change in the outer diameter.

EXAMPLE 2

$Nb_2O_5$ was fired at 1400° C. for 16 hours, pulverized, and classified to obtain a $Nb_2O_5$ powder with particle diameters in the 3 to 45 $\mu$m range. Finely-divided Zn particles were uniformly deposited on the surface of this $Nb_2O_5$ powder by sputtering. The resulting material was heated at 1100° C. for 2 hours, so that a $Nb_2O_5$ powder with a surface coating of ZnO of a thickness of 0.3 $\mu$m was obtained.

40 parts by volume of this ZnO-coated $Nb_2O_5$ powder and 60 parts by volume of a low-melting-point glass (84.3 wt. % of PbO, 2.8 wt. % of ZnO, 11.9 wt. % of $B_2O_3$, and 1.0 wt. % of $SiO_2$; transition point 300° C.; thermal expansion coefficient $112 \times 10^{-7}/°$ C. in the 30 to 250° C. range) were mixed, and a button of an outer diameter of 20 mm and a height of 5 mm was produced in a metal mold from a weight in grams of the mixed powder equivalent to the true specific weight of the mixed powder.

This button was placed on a glass plate and heated in an electric furnace at 450° C. for 10 minutes in the same manner as in Example 1. As a result, the button flowed to an outer diameter of 25 mm. When a button of an $Nb_2O_5$ sample prepared by the same process without the surface coating with ZnO was heated under the same conditions, there was essentially no change in the outer diameter.

EXAMPLE 3

On the surface of commercially available finely-divided particles of $Si_3N_4$ with particle diameters in the 3 to 45 $\mu$m range and an average particle diameter of 10 $\mu$m was formed a layer of Cu with a thickness of about 0.1 $\mu$m by a non-electrolytic plating process to impart electro-conductivity to the $Si_3N_4$ particles.

A ZnO layer with a thickness of about 0.3 $\mu$m was then formed on the surface of the Cu-coated $Si_3N_4$ particles particles by an electrolytic plating. The resulting material was heated at 1000° C. for 2 hours, so that a $Si_3N_4$ powder with a surface coating of ZnO of a thickness of 0.3 $\mu$m was obtained.

40 parts by volume of this ZnO-coated $Si_3N_4$ powder and 60 parts by volume of a low-melting-point glass (70.0 wt. % of Pbo, 17.0 wt. % of $B_2O_3$, 10.0 wt. % of $SiO_2$, and 3.0 wt. % of ZnO; transition point 400° C.; thermal expansion coefficient $81 \times 10^{-7}/°$ C. in the 30 to 300° C. range) were mixed, and a button of an outer diameter of 20 mm and a height of 5 mm was produced in a metal mold from a weight in grams of the mixed powder equivalent to the true specific weight of the mixed powder.

This button was placed on a glass plate and heated in an electric furnace at 530° C. for 10 minutes. As a result, the button flowed to an outer diameter of 24 mm. No bubbles were observed. When a button of a $Si_3N_4$ sample prepared by the same process without the surface coating with ZnO was heated under the same conditions, the button flowed to an outer diameter of 24 mm, but the formation of bubbles was observed throughout the entire body of the sample.

The sealing material of the present invention, as explained above, comprises a low-melting-point glass and a filler which has its surface modified by coating with ZnO and is compatible with glass, and has a lower dielectric constant, higher mechanical strength, and lower expansion characteristics than can be obtained in a sealing material in which conventional fillers are used. The sealing material of the present invention is therefore highly suitable for sealing electronic parts.

What is claimed is:

1. A sealing material comprising a low-melting-point glass selected from the group consisting of:
   (a) a $PbO$-$B_2O_3$ based glass consisting essentially of 40 to 90 wt. % of PbO and 8 to 15 wt. % of $B_2O_3$,
   (b) a $PbO$-$ZnO$-$B_2O_3$ based glass consisting essentially of 70 to 85 wt. % of PbO, 9.5 to 15 wt. % of ZnO, and 7 to 20 wt. % of $B_2O_3$, and
   (c) a $PbO$-$B_2O_3$-$SiO_2$ based glass consisting essentially of 40 to 80 wt. % of PbO, 8 to 20 wt. % of $B_2O_3$ and 5 to 45 wt. % of $SiO_2$; and a filler coated with a ZnO layer.

2. A sealing material as claimed in claim 1, wherein said filler is a silica glass.

3. A sealing material as claimed in claim 1, wherein said filler is a crystalline oxide.

4. A sealing material as claimed in claim 1, wherein said filler is a nitride.

5. A sealing material as claimed in claim 3, wherein said crystalline oxide is selected from the group consisting of $ZrW_2O_8$, $Ta_{16}W_{16}O_{94}$ and $Nb_2O_5$.

6. A sealing material as claimed in claim 4, wherein said nitride is selected from the group consisting of $Si_3N_4$, AlN and BN.

7. A sealing material as claimed in claim 1, wherein said ZnO layer has a thickness ranging from 0.01 μm to 1 μm.

8. A sealing material as claimed in claim 1, comprising 45-90 vol. % of the glass and 10-55 vol. % of the filler.

9. A sealing material as claimed in claim 8, comprising 60 vol. % of the glass and 40 vol. % of the filler.

* * * * *